United States Patent
Tsuda et al.

(10) Patent No.: US 10,138,597 B2
(45) Date of Patent: Nov. 27, 2018

(54) WIRE (71) Applicant: HI-LEX CORPORATION, Hyogo (JP)

(72) Inventors: Akira Tsuda, Hyogo (JP); Tomo Sakaguchi, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 65 days.

(21) Appl. No.: 15/125,275

(22) PCT Filed: Mar. 12, 2015

(86) PCT No.: PCT/JP2015/057358
§ 371 (c)(1),
(2) Date: Sep. 12, 2016

(87) PCT Pub. No.: WO2015/137462
PCT Pub. Date: Sep. 17, 2015

(65) Prior Publication Data
US 2017/0073889 A1  Mar. 16, 2017

(30) Foreign Application Priority Data

Mar. 13, 2014 (JP) .................................. 2014-050426

(51) Int. Cl.
*D07B 1/00* (2006.01)
*D07B 1/06* (2006.01)
(Continued)

(52) U.S. Cl.
CPC ............. *D07B 1/0693* (2013.01); *D07B 1/22* (2013.01); *D07B 5/005* (2013.01); *D07B 5/007* (2013.01);
(Continued)

(58) Field of Classification Search
CPC ...... D07B 1/0673; D07B 1/0693; D07B 1/22; D07B 1/00; D07B 1/005; D07B 1/06;
(Continued)

(56) References Cited

U.S. PATENT DOCUMENTS

| 3,822,542 A * | 7/1974 | Naud ..................... D07B 1/068 |
| | | 57/215 |
| 2009/0042052 A1* | 2/2009 | Tsuda ................... D07B 1/0673 |
| | | 428/592 |
| 2012/0297746 A1* | 11/2012 | Chou ....................... D07B 1/02 |
| | | 57/230 |

FOREIGN PATENT DOCUMENTS

| CN | 201843001 U | 5/2011 | |
| DE | 102011053795 A1 * | 3/2013 | ............ E05F 11/483 |

(Continued)

OTHER PUBLICATIONS

International Search Report from International Application No. PCT/JP2015/057358 dated Jun. 9, 2015.
(Continued)

*Primary Examiner* — Matthew D Matzek
(74) *Attorney, Agent, or Firm* — Brundidge & Stanger, P.C.

(57) ABSTRACT

An operating wire has a multi-twisted structure constituted by twisting side strands, each formed by twisting element wires together around a core strand. A side element wire of the side strand faces the outside of the operating wire in the radial direction at a site located on the outer circumference of the operating wire and has a flattened surface where a flat portion provided in a portion of the side element wire in the circumferential direction extends in the X axis direction, the length in the X axis direction of the flattened surface being 4.8-11.0 times the diameter of the side element wire, and the pitch magnification of the side strand being 7.0-12.0 times the diameter.

3 Claims, 3 Drawing Sheets

(51) Int. Cl.
*D07B 5/00* (2006.01)
*D07B 1/22* (2006.01)
*F16C 1/20* (2006.01)

(52) U.S. Cl.
CPC ............... *F16C 1/20* (2013.01); *D07B 1/068* (2013.01); *D07B 2201/2002* (2013.01); *D07B 2201/2007* (2013.01); *D07B 2501/2084* (2013.01)

(58) Field of Classification Search
CPC ............... D07B 1/068; D07B 2201/00; D07B 2201/10; D07B 2201/104; D07B 2201/1044
USPC .......... 57/215, 212, 213; 428/357, 364, 397, 428/400; 174/128.1
See application file for complete search history.

(56) References Cited

FOREIGN PATENT DOCUMENTS

| | | |
|---|---|---|
| JP | 5-230783 A | 9/1993 |
| JP | H06-108388 A | 4/1994 |
| JP | 2006-283269 A | 10/2006 |
| WO | 2006095765 A1 | 9/2006 |

OTHER PUBLICATIONS

Extended European Search Report for 15761466.0 dated Sep. 11, 2017.

\* cited by examiner

WIRE

TECHNICAL FIELD

The present invention relates to an operating wire having a multiple strand structure, and particularly relates to an operating wire which is set around a direction turning member and a wire operation mechanism using the wire.

BACKGROUND ART

An operating wire has been used for transmitting an operating force of a driving part to a driven part. For example, in a window regulator of a vehicle, a motor serving as a driving part and a carrier plate configured to support a window glass which serves as a driven part are coupled together with an operating wire, and the operating force of the driving part is transmitted through the operating wire. The operating wire has flexibility and allows for curved wiring. The operating wire is guided in a sliding manner by a direction turning member such as a guide member for turning the direction of the operating wire. Typically, the operating wire is composed of a plurality of element wires which are twisted together. When the operating wire is guided by a slide movement groove or the like of a direction turning member formed of a material softer than the operating wire such as a fixation guide made of a resin (hereinafter referred to simply as "resin guide"), abnormal noise is generated in some situation at the contacting part between an element wire exposed at the outer side of the operating wire and the direction turning member.

Such abnormal noise is generated as follows. Strand tracks of the operating wire are reflected on the direction turning member in the using process, and strand-shaped irregularities are formed. Here, when the operating wire and the direction turning member slide on each other, the operating wire is twisted by a rotational force exerted on the operating wire when the strand-shaped irregularities slides. When this twist of the operating wire is released, tapping abnormal noise is generated at the sliding surface of the direction turning member, thus generating the abnormal noise. In particular, when a window regulator is installed in a vehicle, the vibration sound is amplified through the guide rail and the door panel, thus generating abnormal noise.

Figure 6:
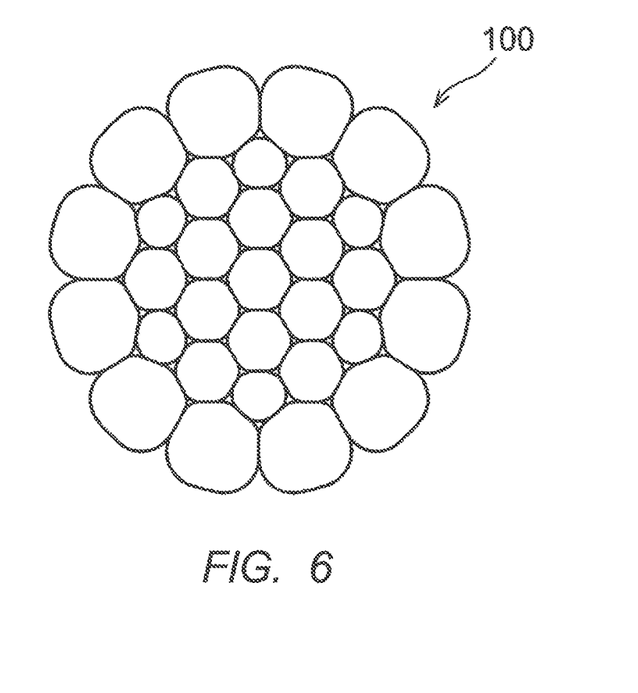
FIG. 6 is a sectional view of a conventional deformed wire strand.

PTL 1 discloses a working method of single-deformed wire strand 100 having an element wire whose cross sectional shape is not circle (see FIG. 6). Deformed wire strand 100 has a smooth surface, and therefore formation of the strand track and generation of abnormal noise may possibly be suppressed. Deformed wire strand 100 is a parallel strand, and is worked in a deformed line shape in the state where wires (element wires) of the layers are in a line contact with each other.

In addition, for the purpose of reducing the abnormal noise, a configuration has been proposed in which twist of the operating wire is suppressed by providing a rotation resistant property so as to suppress the tapping abnormal noise on the sliding surface of the operating wire at the slide movement groove of the direction turning member due to strand tracks which are strand-shaped irregularities (PTL 2).

CITATION LIST

Patent Literature

PTL 1
Japanese Patent Application Laid-Open No. 6-108388

PTL 2
Japanese Patent Application Laid-Open No. 2006-283269

SUMMARY OF INVENTION

Technical Problem

However, when the working method disclosed in PTL 1 is applied to a wire having a multiple strand structure, the fatigue resistance of the wire may be reduced. Such reduction in fatigue resistance is caused as follows. In a wire having a multiple strand structure, element wires are in point contact with each other and therefore the point contact spots are preferentially deformed when the above-described working is applied. Consequently, when the wire is used, the element wire is easily cut at the deformed portions. In addition, even when an operating wire provided with a rotation resistant property such as the wire disclosed in PTL 2 is used, it was confirmed that, depending on the use condition such as a high temperature condition, cyclic abnormal noise (hereinafter referred to as "groove movement sound") is generated when the element wire of the outermost periphery of the operating wire located at the groove of the strand track goes through the protruding portion of the strand track.

To solve the above-mentioned problems, an object of the present invention is to provide an operating wire which can suppress generation of cyclic groove movement sound and reduction in fatigue resistance of the wire due to slide movement between a direction turning member and the wire.

Solution to Problem

An operating wire of the embodiment of the present invention has a multiple strand structure. The multiple strand structure is composed of a core strand composed of a plurality of element wires which are twisted together, and a plurality of side strands disposed around the core strand, each of the side strands being composed of a plurality of element wires which are twisted together, the core strand and the side strands being twisted together; a side element wire of the side strand includes a smooth surface at a portion located on an outer periphery of the operating wire, the smooth surface comprising a flat part which is provided facing radially outside of the operating wire at a part of the side element wire in a circumferential direction, the flat part extending along an axial direction; an axial length of the smooth surface is 4.8 to 11.0 times a diameter of the side element wire; and a pitch multiplying factor of the side strand is 7.0 to 12.0 times.

Preferably, in the operating wire, the axial length of the smooth surface is 5.8 to 9.2 times the diameter of the side element wire.

In addition, a wire operation mechanism includes: a driving part; a driven part; and a direction turning member made of a resin, wherein: the driving part and the driven part are connected together through the operating wire; the operating wire is set around the direction turning member with a predetermined load, and, when the operating wire is moved by driving the driving part to move the driven part, the operating wire moves in a direction in which the operating wire extends with respect to a position of the direction turning member.

Advantageous Effects of Invention

According to the present invention, it is possible to suppress generation of cyclic groove movement sound and reduction in fatigue resistance of the wire due to slide movement between a direction turning member and the wire.

DESCRIPTION OF EMBODIMENTS

In the following, a wire of an embodiment of the present invention will be described in detail with reference to the accompanying drawings.

The wire of the embodiment of the present invention is an operating wire which transmits an operating force generated by the operation of the driving part to an driven part which is operated through the wire at a position away from the operation part in such a manner that the wire is pulled or pushed by the operation of the driving part. The wire of the embodiment of the present invention is guided by a direction turning member such as a fixation guide which non-rotatably guides the wire and a pulley which rotates around the rotation axis for example, and installed between a driving part and a driven part. The driving part and the driven part are not limited as long as the driving part and the driven part and can be operated with the wire, or the driving part and the driven part can operate the wire. The wire of the embodiment of the present invention can be applied to the uses in which the direction is turned by a direction turning member, the wire is installed between the driving part and the driven part, and the wire transmits the operating force of the driving part to the driven part. For example, the wire of the embodiment of the present invention can be used for operating window regulators, parking brakes, fuel lid actuators, bike accelerators, bike screens and the like. In addition, the wire of the embodiment of the present invention is also applicable to the uses other than vehicles.

Figure 1:
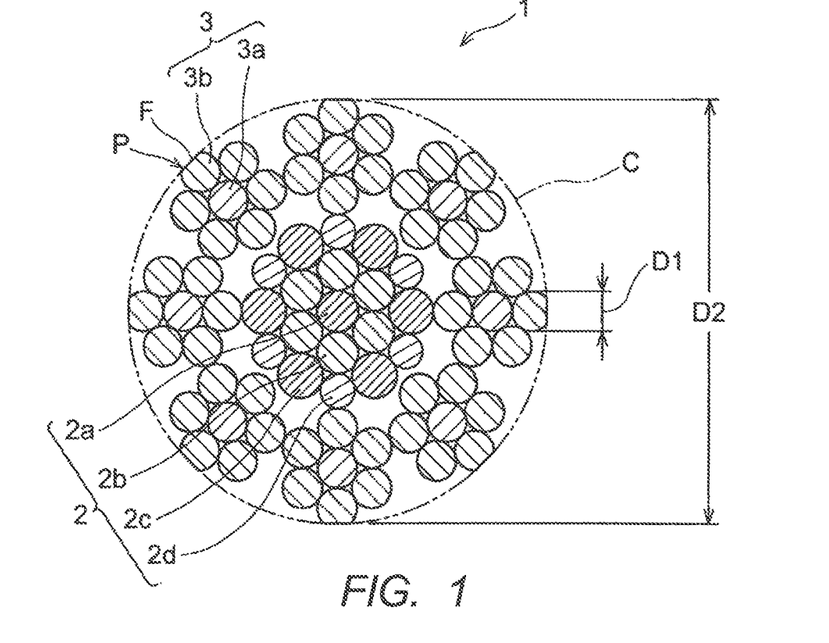
FIG. 1 is a sectional view illustrating an exemplary structure of a wire of an embodiment of the present invention.
Figure 2:
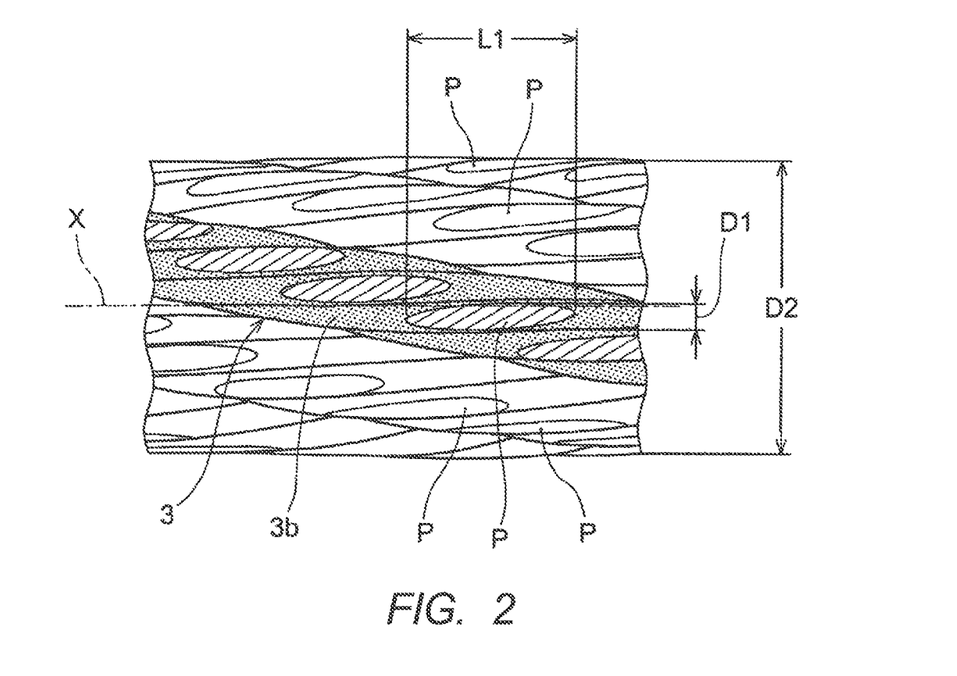
FIG. 2 is a side view of the wire of FIG. 1.

An example of the wire of the embodiment of the present invention is illustrated in FIG. 1 and FIG. 2. FIG. 1 is a sectional view illustrating a structure of wire 1 of the embodiment, and FIG. 2 is a side view schematically illustrating wire 1. For convenience of description, in FIG. 2, side strand 3 at a center portion is dotted. As illustrated in FIG. 1, wire 1 of the embodiment of the present invention has a multiple strand structure in which core strand 2 and a plurality of side strands 3 around core strand 2 are twisted together. Core strand 2 is composed of a plurality of element wires 2a, 2b, 2c and 2d which are twisted together, and each of side strands 3 is composed of a plurality of element wires 3a and 3b which are twisted together. Wire 1 is not limited as long as wire 1 has a multiple strand structure in which core strand 2 and a plurality of side strands 3 disposed around core strand 2 are twisted together. Wire 1 may be appropriately changed in accordance with the use of the wire, and multiple strand structures including publicly known structures other than the structure illustrated in FIG. 1 may be employed. It is to be noted that in the embodiment illustrated in FIG. 1, wire 1 has a structure in which eight side strands 3 are twisted around one core strand 2 (W(19)+ 8×7). Core strand 2 is illustrated as a Warrington strand in which six side element wires 2b are twisted around one core element wire 2a, and side element wire 2c and side element wire 2d having different sizes are twisted together around side element wire 2b such that side element wire 2c and side element wire 2d are alternately disposed. In addition, in each side strand 3, six side element wires 3b are twisted together around one core element wire 3a.

Examples of the material of the element wires of core strand 2 and side strand 3 include steel wires such as a zinc plated steel wire and a stainless steel wire, for example. In addition, the diameter and the number of the element wires of core strand 2 and side strand 3 may be appropriately changed in accordance with the use of the wire and the structure of the wire.

As illustrated in FIG. 1 and FIG. 2, side element wire 3b of side strand 3 of wire 1 of the embodiment of the present invention has smooth surface P at a portion located on the outer periphery of wire 1. To be more specific, smooth surface P is provided so as to face the radially outside of wire 1 at the element wire of the outermost periphery of wire 1 in element wire 3b of side strand 3, and is extended along the X axis. In addition, as illustrated in FIG. 1 and FIG. 2, smooth surface P is formed such that flat part F provided at a part of side element wire 3b in the circumferential direction faces the radially outside of the wire 1 and extends along the X-axis direction. Flat part F is a flat portion which is formed along the circumferential direction of side element wire 3b in side element wire 3b of side strand 3. In the embodiment illustrated in FIG. 1, flat part F is illustrated as a substantially arc-like portion having a curvature radius substantially the same as the radius of virtual circle C whose radius is a line connecting the contact point of flat part F and the center of wire 1, but flat part F may also be a flat surface or a curved surface. That is, as described in detail later, it suffices that smooth surface P formed by extending flat part F is formed in a flat shape such that smooth surface P makes surface contact with a direction turning member, and smooth surface P may have a curvature radius different from that of virtual circle C of wire 1. In addition, flat part F is provided to face the radially outside of the wire 1 at a part of side element wire 3b in the circumferential direction, that is, at the outer periphery of side element wire 3b in the cross-section taken along a direction perpendicular to the extending direction of the side element wire 3b. Flat part F may not be located on virtual circle C as long as surface contact on the direction turning member can be achieved when wire 1 makes contact with the direction turning member. In addition, smooth surface P is formed such that flat part F formed in the above-mentioned fashion is extended in a direction parallel to the X axis of the extending direction of wire 1, and is capable of making surface contact with the slide movement groove of the direction turning member as illustrated in FIG. 2.

As illustrated in FIG. 1 and FIG. 2, side element wires 3b of side strand 3 are twisted together around core element wire 3a of side strand 3 in a spiral form. Each side element wire 3b has smooth surface P formed at a portion located on the outer periphery of wire 1, and side element wire 3b has a circular cross sectional shape at both sides of the portion of smooth surface P in the X-axis direction (the horizontal direction in FIG. 2). Thus, a plurality of smooth surfaces P are formed in the X-axis direction and the circumferential direction of wire 1 with a plurality of side element wires 3*b* which are exposed at the outer periphery of wire 1 at the portions located on the outer periphery of wire 1 which have a possibility of making contact with the direction turning member, as illustrated in FIG. 2.

It is to be noted that, as long as the effects described later can be achieved, the manufacturing method of wire 1 having smooth surface P is not limited, and for example, such wire 1 can be formed through drawing with use of dies, swaging, cassette roller dies working and the like after core strand 2 and side strand 3 are twisted together.

Smooth surface P which is formed in the above-mentioned manner makes surface contact with the direction turning member when wire 1 makes contact with the direction turning member not illustrated (the surface of the guide groove of the direction turning member which guides wire 1). Accordingly, with wire 1 of the embodiment of the present invention, it is possible to suppress the load per unit area of contact between wire 1 and the direction turning member since side element wire 3*b* of side strand 3 is provided with smooth surface P. While, in the conventional wires, the element wire of the side strand has an angle with respect to the axis direction of wire 1 and consequently forms a strand track which is a groove having an angle with respect to the movement direction of wire 1, wire 1 of the embodiment of the present invention can reduce formation of the strand track even when wire 1 exerts a high load on the direction turning member or when the direction turning member is under a high temperature environment since the load of wire 1 exerted on the direction turning member per unit area is reduced. Thus, since formation of the strand track on the direction turning member is reduced, it is possible to reduce the groove movement sound which is generated by movement of side element wire 3*b* of wire 1 between the grooves of the strand track in the case where wire 1 moves in the extending direction of wire 1 with respect to the direction turning member. It is to be noted that, in the embodiment illustrated in FIG. 1 and FIG. 2, smooth surface P has substantially the same curvature radius as that of virtual circle C. However, as long as the smooth surface makes contact with the direction turning member such that the load from wire 1 exerted on the direction turning member per unit area is reduced, the smooth surface of the embodiment of the present invention may be formed to make surface contact with the direction turning member, or smooth surface P may have a curvature radius different from that of the outer periphery of wire 1, or may be formed in a planar shape. It is to be noted that in the case where smooth surface P is a horizontal surface, virtual circle C is a circle which makes contact with the horizontal surface.

Figure 3:
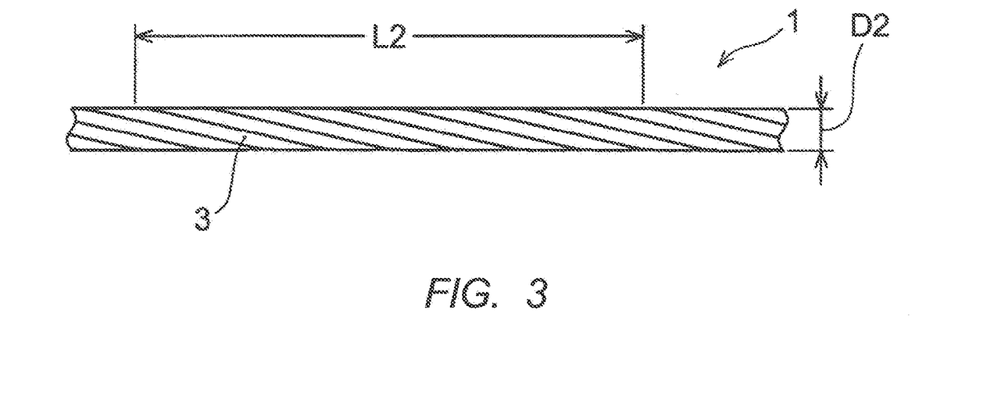
FIG. 3 is a diagram for describing a pitch multiplying factor of a side strand of the wire of the embodiment of the present invention.

Smooth surface P is configured such that length L1 of smooth surface P in the X-axis direction is 4.8 to 11.0 times diameter D1 of side element wire 3*b* of side strand 3, and the pitch multiplying factor of side strand 3 is 7.0 to 12.0 times. Length L1 in the X-axis direction in which wire 1 extends on smooth surface P is the length between both ends of smooth surface P in the X axis direction of wire 1 as illustrated in FIG. 2, and diameter D1 of side element wire 3*b* is the outer diameter of side element wire 3*b* having smooth surface P as illustrated in FIG. 1 and FIG. 2. In addition, as illustrated in FIG. 3, the pitch multiplying factor of side strand 3 is a value obtained by dividing strand pitch length L2 of side strand 3 by outer diameter D2 of wire 1, and, in the present embodiment, the diameter of virtual circle C is outer diameter D2 of wire 2.

With the configuration where length L1 of smooth surface P is 4.8 to 11.0 times diameter D1 of side element wire 3*b* of side strand 3, and further the pitch multiplying factor of side strand 3 is 7.0 to 12.0 times, when wire 1 and the direction turning member make contact with each other, the contact surface between the direction turning member and wire 1 and smooth surface P of side element wire 3*b* of side strand 3 make surface contact with each other, and, the number of point contact spots between element wires per unit area is reduced, thus achieving a high element wire density of wire 1 per unit cross-sectional area. Accordingly, it is possible to reduce formation of the strand track of the direction turning member by side element wire 3*b* of side strand 3, reduce the groove movement sound which is generated when the direction turning member and wire 1 slide on each other, and suppress the reduction in fatigue resistance of the wire.

When length L1 of smooth surface P is smaller than 4.8 times diameter D1 of side element wire 3*b*, the length of the exposed portion of side element wire 3*b* on the outer periphery of wire 1 is small, and the length of smooth surface P in the X-axis direction is small, and consequently, the area of smooth surface P which makes surface contact with the direction turning member is small. As a result, the above-described effect of smooth surface P cannot be obtained. Conversely, when length L1 of smooth surface P is greater than 11.0 times diameter D1 of side element wire 3*b*, the thickness of side element wire 3*b* of side strand 3 is small, and rupture of element wires occurs when a load is exerted on a thin portion in a radial direction even with the same cross-sectional area, and as a result, the fatigue resistance of wire 1 is reduced. In addition, regarding fatigue resistance, also in the case where the pitch multiplying factor of side strand 3 is smaller than 7.0 times, fatigue resistance is reduced because of increase in number of the intersection of element wires per unit length. Specifically, in the exemplary embodiment illustrated in FIG. 1 and FIG. 2, side element wire 3*b* of side strand 3 intersects with and is in point contact with side element wire 2*c* and side element wire 2*d* disposed at the outermost layer of core strand 2. When the pitch multiplying factor of side strand 3 is smaller than 7.0 times, the number of point contact spots between side element wire 3*b* of side strand 3 and side element wires 2*c* and 2*d* of core strand 2 per unit length of wire 1 in X-axis direction increases. When wire 1 is bent by the direction turning member, a local force is applied to the point contact spots of the element wires. In view of this, when the number of the point contact spots of the element wires is large, the possibility of cutting of side element wire 3*b* of side strand 3 is high, and consequently the fatigue resistance of wire 1 is reduced. On the other hand, when the pitch multiplying factor of side strand 3 is greater than 12.0 times, gaps are easily formed between the element wires of wire 1, and the ease of manufacturing is reduced, and also, the durability may possibly be reduced. Specifically, in the exemplary embodiment illustrated in FIG. 1 and FIG. 2, when the pitch multiplying factor of side strand 3 is greater than 12.0 times, core strand 2 cannot be tightly attached on side strand 3, and gaps are easily formed between side element wire 3*b* of side strand 3, and side element wires 2*c* and 2*d* disposed at the outermost layer of the core strand 2. As a result, the element wire density of wire 1 per unit cross-sectional area is reduced, and the ease of manufacturing is reduced, and also, durability of wire 1 may possibly be reduced.

In addition, as described above, in wire 1, the cross-section shape of side element wire 3*b* of side strand 3 is a circular shape at the portions which do not make contact with the direction turning member and are not exposed at the outer periphery of wire 1. The portions of side element wire 3*b* which are not exposed at the outer periphery of wire 1 are located on the inner side in the radial direction of wire 1. In a plurality of side element wires 3*b* of side strand 3, one side element wire 3*b* is spirally extended around core element wire 3*a*. Here, at portions located on the outer periphery of wire 1 (portions exposed at the outer periphery), smooth surface P is formed, and, at portions which are not exposed at the outer periphery of wire 1, side element wire 3*b* is located on the inner side in the radial direction wire 1 and has a circular cross sectional shape, and thus, the portions where smooth surface P is formed and the portions having a circular cross sectional shape are alternately formed in the axial direction in which each side element wire 3*b* is extended. Side element wire 3*b* of side strand 3 has a circular cross sectional shape except for the portion where smooth surface P is formed on the outer periphery of wire 1, and therefore has a uniform strength in the longitudinal direction of the element wire. Accordingly, in wire 1 of the embodiment of the present invention, the point where cutting of side element wire 3*b* may occur is not formed even when the direction is turned by the direction turning member not illustrated and wire 1 is bent, and thus reduction in fatigue resistance can be suppressed.

As described above, according to wire 1 of the embodiment of the present invention, since smooth surface P having a predetermined length is provided at a portion of side element wire 3*b* of side strand 3 located on the outer periphery of wire 1, it is possible to suppress the contact surface pressure between wire 1 and the direction turning member, reduce formation of the strand track, and reduce the groove movement sound which is generated when the direction turning member and wire 1 slide on each other. On the other hand, by setting the length of smooth surface P to a length equal to or smaller than a predetermined length, and twisting side strand 3 at a predetermined pitch multiplying factor, reduction in fatigue resistance can be suppressed. Wire 1 of the embodiment of the present invention can be used for the use in which wire 1 is slid and bent by a direction turning member which is softer than wire 1 such as a resin fixation guide. For example, wire 1 of the embodiment of the present invention is applicable to a wire operation mechanism including: a driving part; a driven part; and a direction turning member made of a resin, wherein the driving part and the driven part are connected together through the wire according to claim 1 or 2; the wire is set around a direction turning member with a predetermined load, and, when the wire is moved by driving the driving part to move the driven part, the wire moves in a direction in which the wire extends with respect to a position of the direction turning member. To be more specific, the wire of the embodiment of the present invention is useful for a window regulator.

EXAMPLES

While examples and comparative examples of the present invention will be described in detail below, the present invention is not limited thereto.

First, the test methods for evaluating the wire slide movement characteristics and the fatigue resistance of examples and comparative examples will be described.

(Test for Wire Slide Movement Characteristics)

Figure 4:
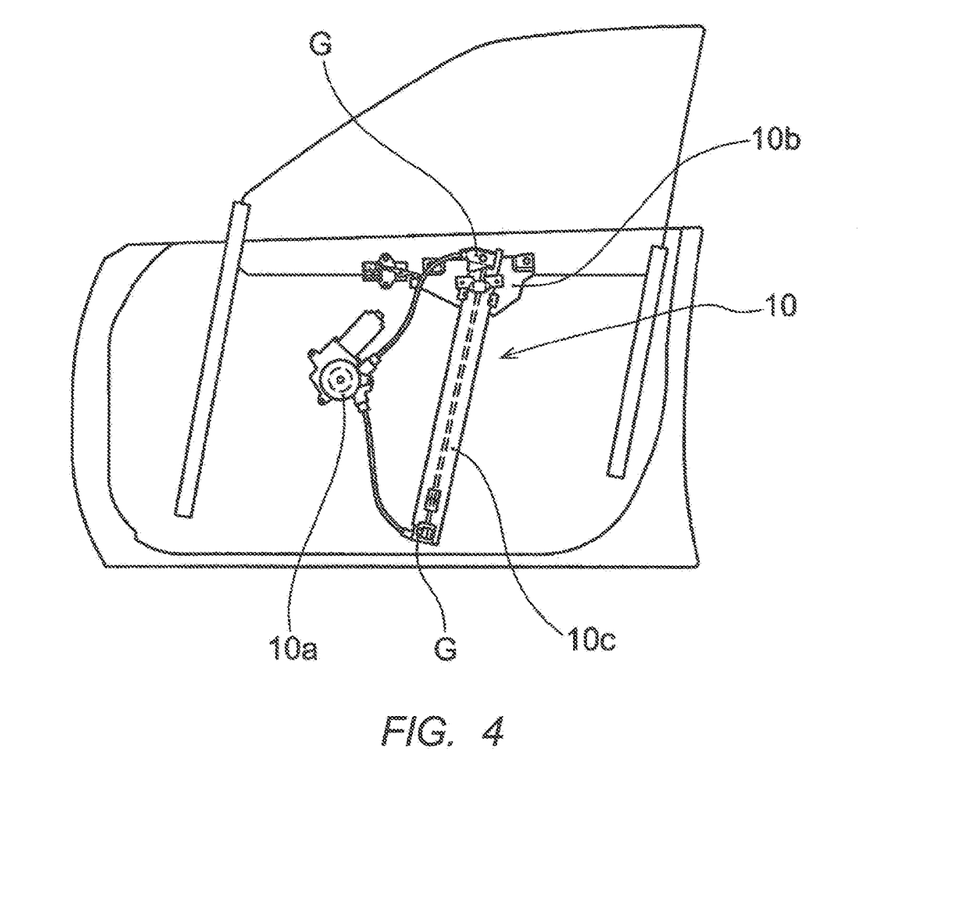
FIG. 4 is a schematic view of a window regulator which is used for measuring a groove movement sound which is generated during slide movement between the fixation guide and the wire.

The wires of the examples and the comparative examples were driven with window regulator 10 illustrated in FIG. 4, and the operation sound was measured at a timing immediately after wire window regulator 10 is attached to fixation guide G (initial state), and at a timing after the creep test to evaluate the wire slide movement characteristics based on the volume of the operation sound generated during sliding movement of the wire. Two wires were attached between motor 10*a* and carrier plate 10*b* of window regulator 10, and were guided by fixation guide G provided at upper and lower sides of guide rail 10*c* of window regulator 10 to turn the direction. Fixation guide G made of a resin which is not rotatable and has a curved surface curved along the guiding direction of the wire was used. In the above-mentioned creep test, a power source voltage of 14.5 V was applied to window regulator 10, carrier plate 10*b* was fixed so as not to vertically move along guide rail 10*c*, and was left for 120 hours at an ambient temperature of 80° C. After 120 hours, the motor was driven, and the groove movement sound, which is cyclic friction sound, was checked by the ears at a distance of 1 m.

(Test for Fatigue Resistance)

Figure 5:
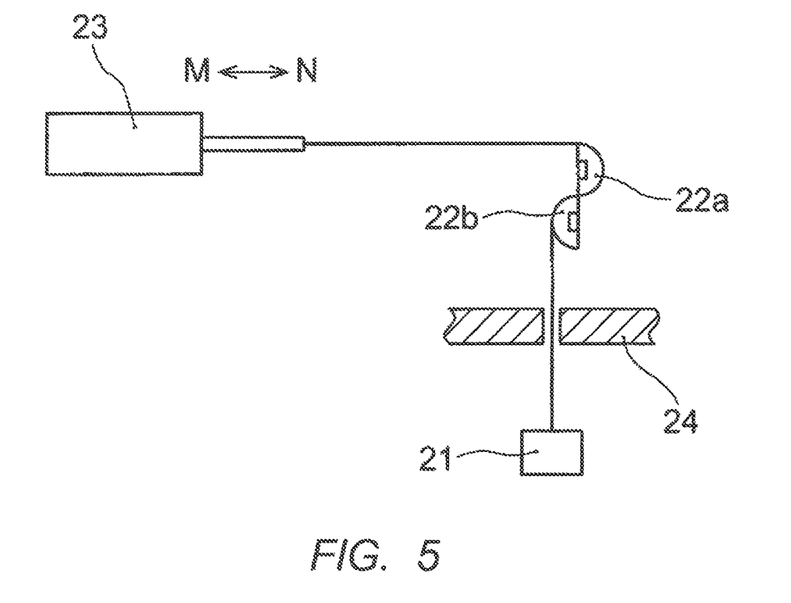
FIG. 5 illustrates an apparatus for measuring fatigue resistance in the case where the wire is bent in a sliding manner by the fixation guide.

The wire of the examples and comparative examples having a total length of 1,000 mm was prepared, and weight 21 of 10 kg was fixed at one end of the wire as illustrated in FIG. 5. The wire was installed such that the wire is turned by 180 degrees at fixation guide 22*b* immediately after being turned by 90 degrees at wire fixation guide 22*a*. In addition, the other end of the wire was fixed to air cylinder 23, and air cylinder 23 was reciprocated in the directions of arrows M and N. After 20,000 reciprocations, the number of cut side element wires of the side strand of the wire was counted. Fatigue resistance was evaluated based on the number of the cut side element wires of the side strand after 20,000 reciprocations. The results are shown in Table 1. It is to be noted that air cylinder 23 was configured to move in the arrow M direction at first to pull the wire in the M direction until weight 21 abuts stopper 24 and the tensile force of the wire reaches 35 kgf. After the tensile force is maintained for 0.5 seconds, air cylinder 23 moves in the arrow N direction. The stroke of the wire was set to 100 mm, and the speed of the wire was set to 20-reciprocation per minute. Olefin grease was sufficiently applied at a portion where the wire and fixation guides 22*a* and 22*b* slide on each other.

Example 1

A zinc-plated steel wire preform (material: JIS G3506 SWRH62A) having an outer diameter of 0.93 mm was subjected to drawing to obtain element wires having diameters of 0.13 mm, 0.14 mm, 0.15 mm, 0.16 mm, and 0.17 mm The element wires were twisted such that the pitch multiplying factor is 11.28 times so as to produce wire 1 having a diameter of 1.490 mm and having the structure (W (19)+8×7) illustrated in FIG. 1. It is to be noted that, in FIG. 1, core element wire 2*a* of core strand 2 was an element wire having a diameter of 0.17 mm, side element wire 2*b* was an element wire having a diameter of 0.16 mm, side element wire 2*c* was an element wire having a diameter of 0.17 mm, side element wire 2*d* was an element wire having a diameter of 0.13 mm, core element wire 3*a* of side strand 3 was an element wire having a diameter of 0.15 mm, and side element wire 3*b* was an element wire having a diameter of 0.14 mm Drawing was performed on the wire with use of a die (diameter reduction rate: 7.5%) to obtain a wire of Example 1 in which the axial length of the smooth surface of the side element wire is 7.22 times the diameter of the side element wire.

Examples 2 to 6

Except for the pitch multiplying factor of the side strand and the multiple value of the length of the smooth surface with respect to the diameter of the side element wire shown in Table 1, wires of Examples 2 to 5 having the pitch multiplying factor of the side strand and the multiple value of the length of the smooth surface with respect to the diameter of the side element wire shown in Table 1 were obtained in the same manner as Example 1. It is to be noted that the diameter reduction rates at the drawing with use of a die were 9.3% (Example 2), 9.8% (Example 3), 6.8% (Example 4), and 7.5% (Example 5), respectively.

Comparative Examples 1 to 4

Except for the pitch multiplying factor of the side strand and the multiple value of the length of the smooth surface with respect to the diameter of the side element wire shown in Table 1, the wires of Comparative examples 1 to 4 having the pitch multiplying factor of the side strand and the multiple value of the length of the smooth surface with respect to the diameter of the side element wire shown in Table 1 were obtained in the same manner as in Example 1. It is to be noted that the diameter reduction rates at the drawing with use of a die were 4.8% (Comparative example 1), 4.3% (Comparative example 2), and 4.1% (Comparative example 3), respectively.

Results of the tests for the slide movement characteristics and the fatigue resistance in Examples 1 to 5 and Comparative examples 1 to 3 are shown in Table 1.

Regarding the groove movement sound, "poor" indicates that the volume of the groove movement sound was large and uncomfortable, "fair" indicates that generation of the sound was found but the volume was not uncomfortable, and "good" indicates that almost no groove movement sound was recognized or no groove movement sound was recognized.

In addition, regarding fatigue resistance, "good" indicates that no cut side element wire was found after 20,000 times, "fair" indicates that the number of the cut side element wires was equal to or smaller than 10% of the total number after 20,000 times, and "poor" indicates that the number of the cut side element wires was equal to or greater than 10% of the total number after 20,000 times.

TABLE 1

| Sample | | | | |
|---|---|---|---|---|
| Property A Length of smooth surface of side element wire/ diameter of side element wire (multiple) | Property B Pitch multiplying factor of side strand (multiple) | Evaluation | | |
| | | Groove movement sound | Fatigue resistance | Durability |
| Ex.1 | 7.22 | 11.3 | good | good | good |
| Ex.2 | 5.12 | 11.0 | fair | good | good |
| Ex.3 | 6.3 | 7.6 | good | good | fair |
| Ex.4 | 8.7 | 10.9 | good | good | good |
| Ex.5 | 10.8 | 11.8 | good | fair | good |
| Comp EX.1 | 4.58 | 11.59 | poor | good | fair |
| Comp EX.2 | 11.3 | 7.3 | good | poor | good |
| Comp EX.3 | 6.2 | 6.8 | good | poor | good |

As shown in Table 1, in Examples 1 to 5, reduction of the groove movement sound was favorable since the length of the smooth surface is 4.8 to 11.0 times the diameter of the side element wire. In Examples 1, and 2 to 5 in particular, reduction of the groove movement sound was excellent since the length of the smooth surface is 5.8 to 9.2 the diameter of the side element wire.

In addition, as shown in Table 1, in Examples 1 to 4 in which the pitch multiplying factor of the side strand is 7.0 to 12.0 times, no cut side element wire was found after 20,000 times and fatigue resistance was excellent. In addition, in Example 5, since the pitch multiplying factor of the side strand is 7.0 to 12.0 times but the length of the smooth surface is equal to or smaller than 12.0 times the diameter of the element wire of the side strand which is greater than greater than 9.2 times the diameter of the element wire of the side strand, the fatigue resistance was poor in comparison with Examples 1 to 4 although it can be said to be favorable. In contrast, in Comparative examples 1 and 2, even when the pitch multiplying factor of the side strand is 7.0 to 12.0 times, the volume of the groove movement sound was large when the length of the smooth surface is smaller than 4.8 times the diameter of the element wire of the side strand (Comparative example 1), and the fatigue resistance was reduced when the length of the smooth surface is greater than 11.0 times the diameter of the element wire of the side strand. In addition, in Comparative example 3, the fatigue resistance was reduced even when the length of the smooth surface is 4.8 to 11.0 times the diameter of the side element wire since the pitch multiplying factor of the side strand is smaller than 7.0 times. While the tests for the slide movement characteristics and the fatigue resistance were performed in Examples 1 to 5 and Comparative examples 1 to 3 with the structure (W(19)+8×7) manufactured as illustrated in FIG. 1, it can be said that similar results can be obtained with use of other multiple strand structures. It is to be noted that, in the case where the pitch multiplying factor of the side strand is greater than 12.0 times, the operating wire could not be obtained since the manufacturing was difficult. However, if new manufacturing methods are developed in the future, it can be said that effects similar to those of the examples can be achieved.

As described above, when the multiplying factor of the length of the smooth surface with respect to the diameter of the side element wire of the side strand is set to 4.8 to 11.0 times, and the pitch multiplying factor of the side strand is set to 7.0 to 12.0 times, generation of the groove movement sound during slide movement between the direction turning member and the wire can be reduced, and reduction in fatigue resistance of the wire can be suppressed. Further, when the axial length of the smooth surface is set to 5.8 to 9.2 times the diameter of the side element wire, generation of the groove movement sound can be further reduced, and also, reduction in fatigue resistance can be further suppressed.

REFERENCE SIGNS LIST

1 Wire
2 Core strand
2*a* Core element wire of core strand
2*b*, 2*c*, 2*d* Side element wire of core strand
3 Side strand
3*a* Core element wire of side strand
3*b* Side element wire of side strand
C Virtual circle connecting outermost layer of wire
D1 Diameter of side element wire of side strand
D2 Diameter of wire
F Flat part
L1 Length of smooth surface
L2 Length of strand pitch of side strand
P Smooth surface
X Axis

The invention claimed is:

1. An operating wire rope having a multiple strand structure, wherein:
the multiple strand structure is composed of
a core strand composed of a plurality of element wires which are twisted together, and
a plurality of side strands disposed around the core strand, each of the side strands being composed of a plurality of element wires which are twisted together, the core strand and the side strands being twisted together;
a side element wire of the side strand includes a smooth surface at a portion located on an outer periphery of the operating wire rope, the smooth surface comprising a flat part which is provided facing radially outside of the operating wire rope at a part of the side element wire in a circumferential direction, the flat part extending along an axial direction;
an axial length of the smooth surface is 4.8 to 11.0 times a diameter of the side element wire; and
a pitch multiplying factor of the side strand is 7.0 to 12.0 times, the pitch multiplying factor being defined as a value obtained by dividing a strand pitch length of the side strand by an outer diameter of the operating wire rope.

2. The operating wire rope according to claim 1, wherein the axial length of the smooth surface is 5.8 to 9.2 times the diameter of the side element wire.

3. A wire operation mechanism comprising:
a driving part;
a driven part; and
a direction turning member made of a resin, wherein:
the driving part and the driven part are connected together through the operating wire rope according to claim 1,
the operating wire rope is set around the direction turning member with a predetermined load, and
when the operating wire rope is moved by driving the driving part to move the driven part, the operating wire rope moves in a direction in which the operating wire rope extends with respect to a position of the direction turning member.

\* \* \* \* \*